March 3, 1936.  R. A. LIGHT ET AL  2,032,425

VALVE COCK

Filed Feb. 17, 1934

Inventors
Ralph A. Light and
Joseph W. Price Jr his Attorney

Patented Mar. 3, 1936

2,032,425

UNITED STATES PATENT OFFICE 2,032,425

VALVE COCK

Ralph A. Light, Cynwyd, and Joseph W. Price, Jr., Philadelphia, Pa., assignors to The United States Metallic Packing Company, Philadelphia, Pa., a corporation of Pennsylvania Application February 17, 1934, Serial No. 711,682

2 Claims. (Cl. 121—134)

Our invention relates to valve cocks of the type in which the escape of water and steam from the valve cock casing is regulated by a slide valve actuated by a piston moving in a cylinder, one end of which is connected to a source of high pressure steam or air and the other end of which opens into the valve cock casing typically such a structure as is described and illustrated in the McLain Patent 1,958,091, of May 8, 1934. In devices of this kind as heretofore constructed the entire inner face of the piston is, in effect, subjected to the pressure of steam in the valve cock casing and in addition a spring is provided in such devices tending to force the piston outward in a direction to open the valve and intended to function when the high pressure steam or air acting in the other direction is cut off and we have found that the aggregate pressure of the steam in the valve casing and of the spring has a tendency to move the piston outward and open the valve at times when the opening of the valve is not necessary or desirable and the object of our invention is to provide a construction of such cylinder cocks which will obviate the occurrence of such premature openings of the valve and, generally speaking, our invention consists in forming a seat upon an extension of the piston which projects into or through the cylinder cock chamber of less area than that of the cross section of the piston and providing in the cylinder cock casing a coactive seat against which the seat on the piston extension will contact and form a tight joint when the piston is in the position which it normally occupies and in which it maintains the outlet valve in closed position. In this way and so long as the seats remain in contact with each other we diminish the effective area upon which steam in the cylinder cock casing can act in a direction to move the piston outward and open the valve while, at the same time, as soon as this joint is broken the steam in the cylinder cock casing exerts its force over, in effect, the entire area of the piston in a direction to move it outward.

For practical purposes we prefer to form an annular seat on the piston extension and to provide a coactive annular seat on the socket located in the cylinder cock casing and serving as a support and guide for a reduced end of the piston extension.

Figure 1:
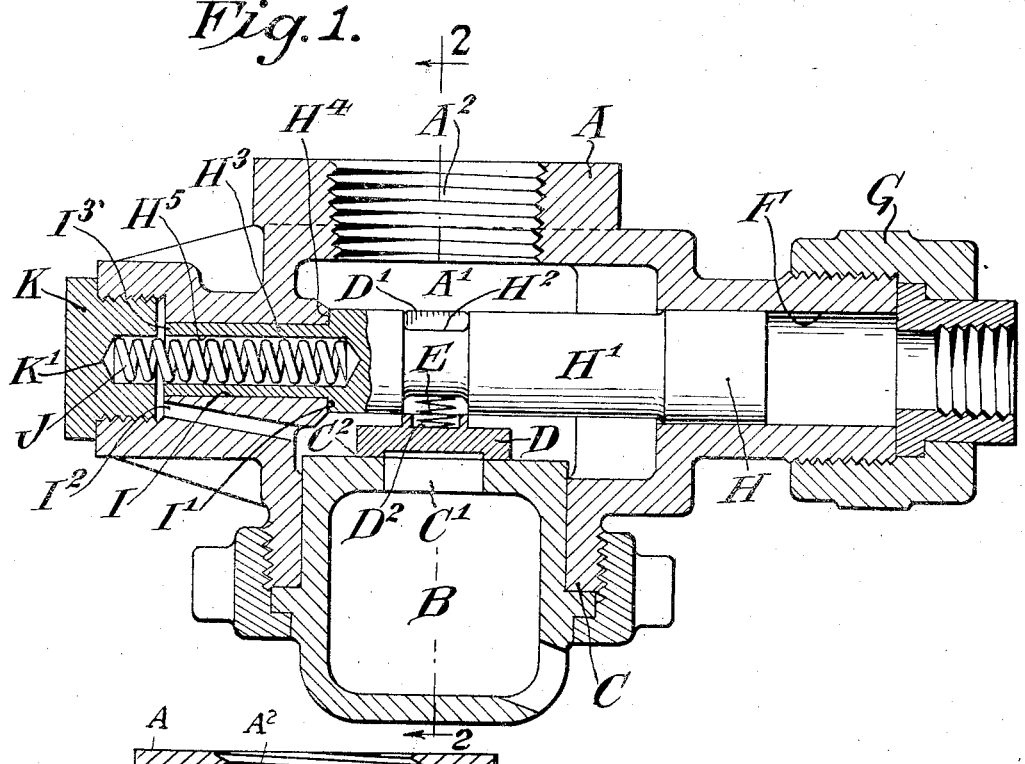
Figure 2:
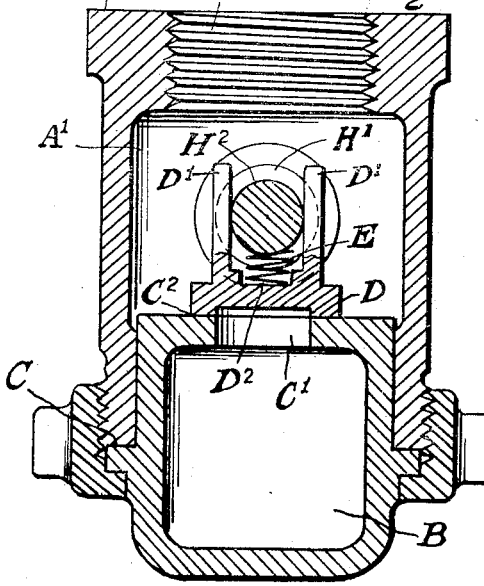

Our invention will be best understood as described in connection with the drawing in which Figure 1 is a sectional elevation of a cylinder cock embodying our improvements and Figure 2 is a sectional view taken on the line 2—2 of Fig. 1, shown on a somewhat reduced scale and with the upper ends of the arms $D^1$ shown in elevation. A indicates the body of the cylinder cock having an internal chamber $A^1$ and an internally threaded opening $A^2$, leading into said chamber, by which it is adapted to be connected to the end of a locomotive cylinder, not shown. B indicates a closure for the bottom of the cylinder cock chamber secured to the bottom of the cylinder cock casing, as indicated at C and having formed in it an outlet port indicated at $C^1$ and a slide valve seat $C^2$ on its inside, surrounding said outlet port $C^1$. D is a slide valve supported and working on the seat $C^2$ and adapted to be connected to an actuating spindle by upwardly extending arms $D^1$. The valve is also provided on its upper face with a spring seat indicated at $D^2$ in which is located a spring E. F is a cylinder which, as shown, extends through the wall of the casing A, the outer end of which is provided with a coupling as indicated at G, by which this end of the cylinder can be connected to a conduit, not shown, leading from a source of high pressure steam or air. H is a piston working in the cylinder F and having an inward extension $H^1$ passing into the chamber $A^1$ and, as shown, across it. A recessed portion $H^2$ engages the arms $D^1$ extending up from the valve and affords an abutment for the spring E. The outer end of the extension is formed of reduced diameter, as indicated at $H^3$, and a seat $H^4$ is formed at the junction of the reduced portion of the extension with the portion of greater diameter. I is a guiding socket formed, as shown, as a part of the casing wall of the cylinder cock which is adapted to receive and guide the reduced end $H^3$ of the piston extension $H^1$ and having its outer end formed as an annular seat $I^1$ adapted to make a tight joint with the annular seat $H^4$ formed on the piston extension when the piston is in the position it occupies when the valve D is in closing position. As shown, openings $I^2$ are formed through the lower portion of the wall of the socket I so that the inner part of the socket will be in free communication with the chamber $A^1$. As shown, the end $H^3$ of the piston rod is hollowed out, as indicated at $H^5$, to receive a spring J which also rests in a socket $K^1$ in a closure K, which closes an opening $I^3$ formed through the wall of the casing at the inner end of the socket I.

In operation, high pressure steam or air is normally in free communication with the outer end of the cylinder F and acts to press the piston H inward and, by the engagement of the piston extension $H^1$ with the valve D, to hold the valve in position to close the port C¹. In this position the annular seat H⁴ of the piston extension is seated upon and forms a tight joint with the annular seat I¹ of the guiding socket I, with the result that any steam pressure existing in the casing chamber A¹ is not exerted upon the annular seat H⁴, although this steam pressure is exerted against all other exposed surfaces of the inner face of the piston H and the piston extension. In addition to whatever steam pressure is exerted in a direction to move the piston outward and open the valve, the spring J also exerts a force tending to move the piston in the same direction and, whenever the aggregate force of the steam pressure in the chamber A¹ and of the spring J is sufficient to impart to the piston an outward movement, the joint between the annular seats H⁴ and I¹ is broken and thereafter, until this joint is again established, the pressure of steam in the casing A is, in effect, exerted over the whole surface of the piston to force it outward and open the valve.

It will be understood that in normal operation of a cylinder cock of the kind indicated in the drawing, the high pressure steam or air admitted to the outer end of the cylinder F should, until the pressure is cut off, hold the piston in its innermost position and the valve closed except when water accumulating in the locomotive cylinder and, of course, in the chamber A¹, brings about excessive pressure, in which case the piston H should move outward and effect a movement of the valve D to open the port C¹. It will also be understood that as soon as pressure steam is cut off from the outer end of the cylinder F the spring J, acting on the piston extension H³, will shift the piston outward and open the valve to where, in effect, the entire inner face of the piston is subjected to the pressure in the chamber A¹, plus the pressure exerted by the spring J. We have found that under ordinary running conditions of a locomotive the aggregate effect of these pressures will sometimes exceed the force exerted by the high pressure steam or air upon the outer end of the piston so that the piston will be moved to open the valve at times when it is not necessary or desirable that the valve should be opened and by providing the abutting seats H⁴ and I¹ which form a tight joint with each other when the piston is in normal valve closing position, we, in proportion to the areas of these contacting surfaces, cut down the pressure exerted by steam in the chamber A¹ in a direction to force the piston outward and thus prevent premature opening of the valve while, at the same time, we insure that as soon as the tight joint is broken the full pressure of steam in the chamber A¹ will be exerted to force the piston outward and thus insure prompt and full opening of the valve.

It will be understood that the pressure in the cylinder cock casing will be normally that of the steam pressure existing in the end of the locomotive cylinder with which the cylinder cock is connected and that the steam pressure in the cylinder will be normally considerably less than the steam pressure in the boiler because normally the flow of steam to the cylinder is controlled by the throttle valve to give only such pressure against the piston as is necessary to enable it to move a train at the desired rate of speed and because the work performed by the steam in the cylinder is effected at the expense of the pressure of the steam acting upon the piston. The end of the cylinder toward which the piston is moving is, of course, connected to exhaust during the greater portion of the stroke of the piston and it is only at the end of the stroke that the exhaust is closed and live steam admitted to cushion the piston at the end of its stroke.

The adjustment of the valve mechanism controlling the admission and exhaust of steam from the locomotive cylinder is intentionally and normally such that the steam pressure communicated to the cylinder cock is less than that of the boiler but a maladjustment of the valve mechanism may at times, though only instantaneously, result in building up a pressure in the cylinder cocks equal to or slightly exceeding that of the boiler and if the valve actuating piston of the cylinder cock is connected to the boiler so that it is exposed to boiler pressure the existence of a higher pressure in the cylinder cock may, if the piston area exposed to this pressure is equal to that exposed to boiler pressure, result in imparting a movement to the piston and through the piston to the valve which will permit the escape of a certain amount of the steam and it is to prevent such an occurrence that our improvement is designed. The co-acting seats on the piston extension and the seat against which the seat on the piston extension rests when the valve is closed, diminishes the effective area of the piston exposed to cylinder cock pressure, thus enabling the outlet valve to remain seated even when the pressure in the cylinder cock chamber is equal to boiler pressure and until the pressure in the cylinder cock chamber materially exceeds the pressure to which the outer end of the valve actuating piston is exposed. This may occur when water condensate fills the cylinder cock chamber and extends into the locomotive cylinder and when this does occur the seal between the seats H⁴ and I¹ is broken by an outward movement of the piston and the entire cross-sectional area of the piston is then exposed to the pressure, insuring that the piston will be moved outward to the full extent necessary to completely open the outlet opening controlled by the slide valve so that the accumulated water will be expelled, after which the falling pressure in the cylinder cock chamber enables the boiler pressure acting upon the outer end of the piston to shift the piston inward, closing the outlet port and bringing the seats H⁴ and I¹ again into sealing contact with each other.

From time to time it may be desirable to clear out accumulating water condensate from the cylinder cock chamber and this can readily be effected by cutting off the steam pressure acting on the outer end of the valve actuating piston whereupon the spring J, together with any steam pressure existing in the cylinder cock, will force the valve actuating piston outward and open the exhaust valve which will again be closed when boiler pressure is again admitted to contact with the outer end of the valve actuating piston H.

Having now described our invention, what we claim as new and desire to secure by Letters Patent, is:

1. In a cylinder cock having a chamber communicating with the cylinder, an outlet port leading from said chamber and a slide valve controlling said outlet port, a cylinder in free communication with the chamber of the cock at one end and a high pressure steam connection at its other end, a piston working in said cylinder and connected to actuate the valve, a piston extension entering the chamber of the cylinder cock, a seat of less area than that of the cross-section of the piston formed on said piston extension and a fixed seat located in the chamber of the cylinder cock adapted to form a tight joint with the seat on the piston extension when the piston is in valve closing position thereby preventing such pressure as may exist in the cylinder cock chamber from acting upon said reduced area while permitting such pressure to be exerted against the residual cross-sectional area of the piston and piston extension.

2. A cylinder cock having the features of claim 1, in which the piston extension is reduced in diameter near its outer end in such manner as to form an annular seat lying between the portions of greater and lesser diameter, a guiding socket provided for the reduced end of the piston extension having its inner end in free communication with the cylinder cock chamber and an annular seat formed on the said annular socket to co-act with the annular seat formed on the piston extension to form a tight joint therewith when the piston is in valve closing position.

RALPH A. LIGHT.
JOSEPH W. PRICE, Jr.